(12) United States Patent
Topp

(10) Patent No.: US 6,612,067 B2
(45) Date of Patent: Sep. 2, 2003

(54) APPARATUS FOR AND METHOD OF ERADICATING PESTS

(75) Inventor: Daniel P. Topp, West Chester, PA (US)

(73) Assignee: Topp Construction Services, Inc., Aston, PA (US)

( * ) Notice: Subject to any disclaimer, the term of this patent is extended or adjusted under 35 U.S.C. 154(b) by 0 days.

(21) Appl. No.: 10/145,184

(22) Filed: May 14, 2002

(65) Prior Publication Data

US 2002/0170227 A1 Nov. 21, 2002

Related U.S. Application Data

(60) Provisional application No. 60/291,407, filed on May 16, 2001.

(51) Int. Cl.⁷ .............................................. A01M 1/00
(52) U.S. Cl. ........................................ 43/124; 422/307
(58) Field of Search ......................... 43/124, 125, 129, 43/130, 132.1, 140, 144; 422/11, 26, 108, 109, 110, 307, 308, 309

(56) References Cited

U.S. PATENT DOCUMENTS

| | | | | |
|---|---|---|---|---|
| 3,811,579 A | * | 5/1974 | Black ........................... 414/347 |
| 4,017,980 A | * | 4/1977 | Kleinguenther .............. 34/396 |
| 4,163,038 A | * | 7/1979 | Nishimura et al. ........... 422/36 |
| 4,620,373 A | * | 11/1986 | Laskowski et al. ........... 34/406 |
| 4,716,676 A | * | 1/1988 | Imagawa ....................... 43/130 |
| 4,961,283 A | * | 10/1990 | Forbes .......................... 43/124 |
| 5,058,313 A | * | 10/1991 | Tallon .......................... 43/124 |
| 5,203,108 A | * | 4/1993 | Washburn, Jr. .............. 43/130 |
| 5,447,686 A | * | 9/1995 | Seidner ........................ 422/26 |
| 5,525,295 A | * | 6/1996 | Pflug et al. ................... 422/27 |
| 5,607,652 A | * | 3/1997 | Hellmuth et al. ........... 422/300 |
| 5,789,007 A | * | 8/1998 | Bianco ........................ 426/263 |
| 5,941,233 A | | 8/1999 | Grinols et al. .......... 126/110 R |
| 5,965,185 A | * | 10/1999 | Bianco ........................ 426/449 |
| 6,141,901 A | | 11/2000 | Johnson et al. .............. 43/124 |
| 6,146,600 A | * | 11/2000 | Williamson ................. 422/307 |
| 6,171,561 B1 | | 1/2001 | Williamson et al. ........ 422/307 |
| 6,227,002 B1 | * | 5/2001 | Bianco et al. ................ 62/302 |
| 6,319,481 B1 | * | 11/2001 | Banks ......................... 422/300 |
| 6,447,737 B1 | * | 9/2002 | Williamson et al. ........ 422/307 |

FOREIGN PATENT DOCUMENTS

DE     3421719    * 12/1985
DE     4025828    * 2/1992

* cited by examiner

Primary Examiner—Peter M. Poon
Assistant Examiner—David J Parsley
(74) Attorney, Agent, or Firm—Mark A. Garzia, P.C.

(57) ABSTRACT

An apparatus and method for eradicating pests through the use of heat. The apparatus has a chamber with a ceiling plenum, a floor plenum and a perforated floor for controlling the flow of air throughout the chamber.

31 Claims, 10 Drawing Sheets

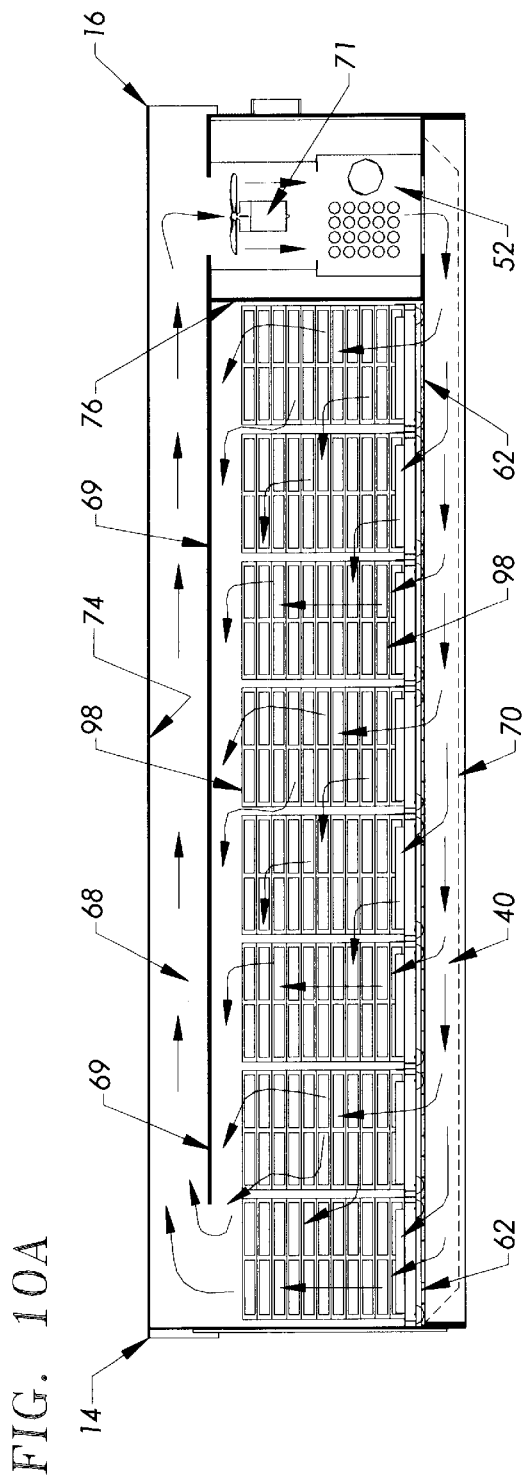
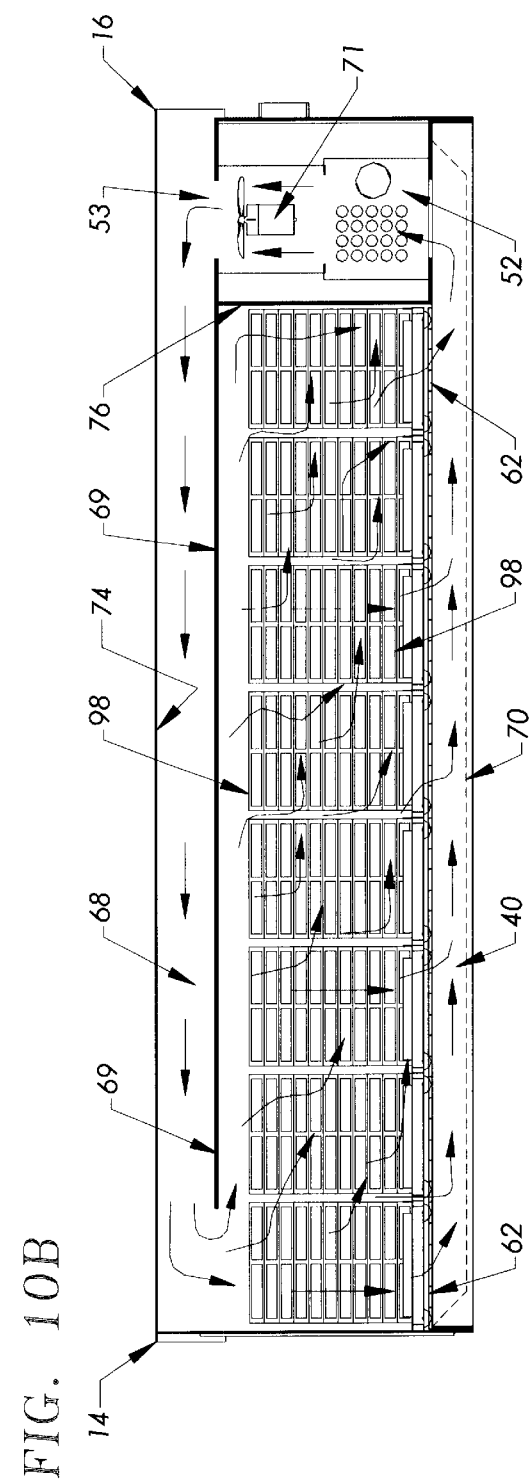
FIG. 10A
FIG. 10B

APPARATUS FOR AND METHOD OF ERADICATING PESTS

CROSS-REFERENCE TO RELATED APPLICATION

The present application claims the benefit under any applicable U.S. statute to U.S. Provisional Patent Application No. 60/291,407 filed May 16, 2001, titled PORTABLE HEAT-TREATING DISINFESTATION APPARATUS.

FIELD OF THE INVENTION

The present invention relates generally to an apparatus for heat-treating wood and, in particular, an apparatus and system for disinfesting a large number of wood products by raising the temperature of the wood products to a specified temperature for a specified period of time.

BACKGROUND OF THE INVENTION

A primary method of treating wood and wood products in order to remove pests was fumigation. The fumigation process consisted of placing the wood products in an enclosed volume and flooding the volume with a hazardous airborne chemical capable of killing pests. The most commonly used chemical to fumigate such wood products is methyl bromide. These fumigation techniques have the potential of endangering human operators who worked nearby and polluting the environment.

The European Union (EU) has decided to prevent the introduction of the pests into the European continent. In order to achieve this goal, the EU has adopted measures requiring the treatment of all wood and wood products including non-manufactured wood packaging (NMWP).

The recently adopted measures by the European Union allow three treatment options for NMWP, namely, heat treatment, fumigation, or chemical pressure impregnation. Although, the EU measures do not call for a specific chemical for use in fumigation or chemical pressure impregnation, individual EU countries may ban the importation of NMWP that have been treated with specific chemicals.

The International Plant Protection Convention has adopted an international standard very similar to those of the European Union that applies to all NMWP, coniferous and hardwood. (The International Plant Protection Convention is recognized by the World Trade Organization as the official international plant protection organization.) The standard currently lists heat treatment as the only "long term measure" to destroy the pests in wood.

The heat treatment measure is less dangerous to workers conducting the treatment and safer for the environment when compared to fumigation or chemical pressure impregnation treatments. Also, in the United States, the Environmental Protection Agency (EPA) is responsible for registering and establishing technical specifications for pesticides. All fumigants are restricted-use pesticides and they may only be purchased and applied by licensed commercial pesticide applicators. Although it is a violation of Federal law for commercial applicators to apply a pesticide in a manner inconsistent with the EPA label, it is the State, not the Federal government, that licenses commercial applicators.

Environmental concerns also arise in connection with the large-scale use of pressure-impregnated wood. For example, the Netherlands has recently prohibited the commercial importation of wood impregnated with copper compounds because of environmental issues. Like fumigants, pressure impregnation chemicals are regulated by the EPA and may only be used by commercial applicators that are licensed by state governments. Therefore, U.S. companies that use wood pallets or NMWP to export goods must deal with a myriad of different agencies if they intend to fumigate or chemically impregnate NMWP.

SUMMARY OF THE INVENTION

The present invention is an apparatus and system for disinfesting a large number of items by raising the temperatures of wood and wood products to a specified temperature for a specified period of time. The items are usually non-manufactured wood and/or non-manufactured wood products.

The apparatus is designed to eradicate pests from both non-manufactured wood and non-manufactured wood products. The apparatus includes an insulated or non-insulated enclosure having a first end, a second external end, a second interior end, a left wall, a right, a rigid basal structure, a primary floor, a sub-floor, an interior ceiling, an interior sub-ceiling, a means for evenly heating the interior of the enclosure and a means of recirculating the air in the enclosure in order to evenly treat the products within the enclosure.

A pair of doors allow ingress to and egress from the interior of the chamber. The doors are positioned at the first end of the chamber.

The apparatus also includes means for heating the interior of the chamber and a means for circulating the heated air. The heating means is preferably mounted at the second end of the chamber between the second interior end and the second external end.

The recirculation means includes the ceiling/subceiling assembly (referred to as a ceiling air plenum) and floor/subfloor assembly (referred to as a floor air plenum). The interior ceiling and the interior sub-ceiling, and the floor/subfloor are uniquely designed to control the flow of air within the chamber. The means for re-circulating the heated air within said interior of said chamber communicates with the heating means. The floor air plenum runs the entire length of the interior floor, and consists of perforated floor sections that form the primary floor.

BRIEF DESCRIPTION OF THE DRAWINGS

The foregoing summary, as well as the following detailed description, may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the present invention not limited to the precise arrangements and instrumentalities shown.

FIG. 10A is a longitudinal cross-sectional view of the apparatus shown fully loaded with pallets, illustrating one example of the direction of air circulation inside the housing;

FIG. 10B is a longitudinal cross-sectional view of the apparatus illustrating another example of airflow within the chamber;

DETAILED DESCRIPTION OF THE PREFERRED EMBODIMENT

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Certain terminology is used in the following description for convenience only and is not limiting. The terms "right", "left", "front", "rear", "outer" and "inner" designate relative directions to which reference is made with respect to the observer's relative position while viewing certain drawings. The terminology includes the words above specifically mentioned, derivatives thereof and words of similar import.

Figure 1A:
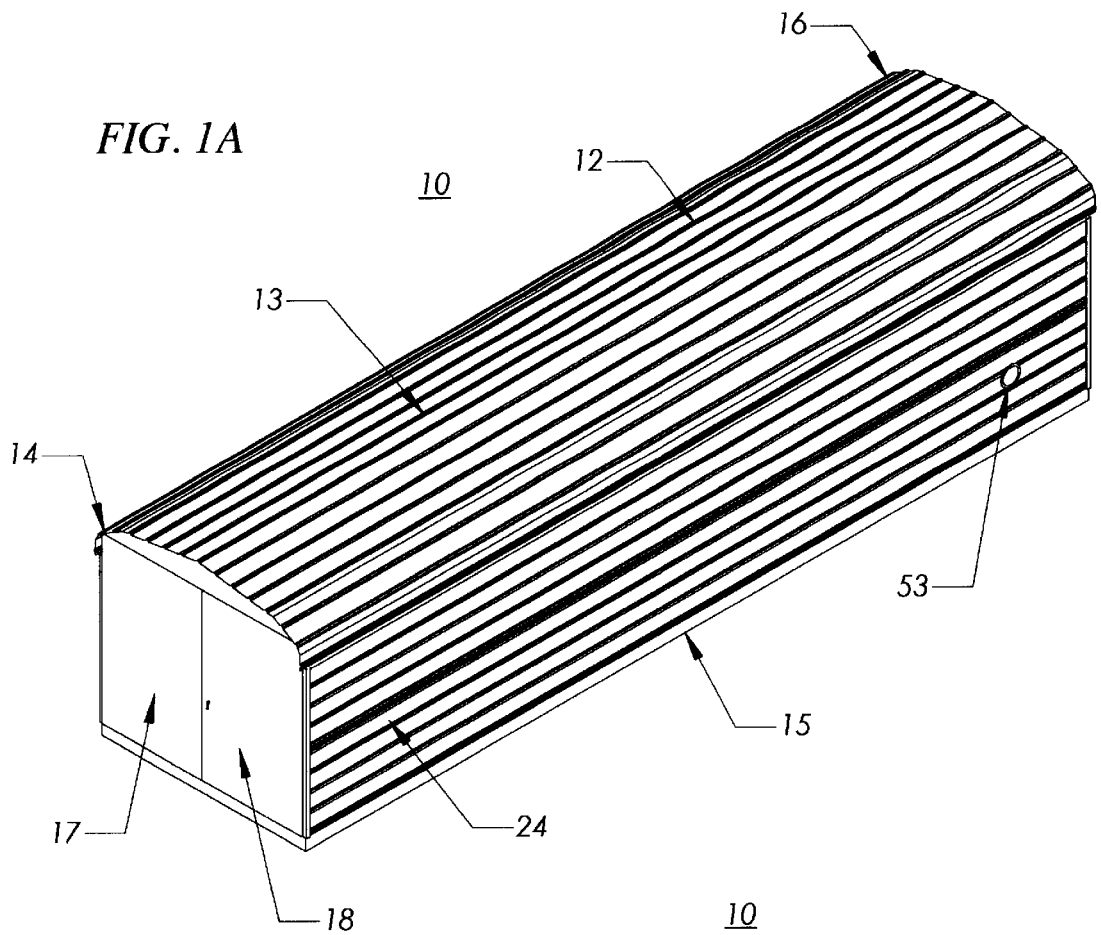
FIG. 1A is a perspective view of an apparatus for eradicating pests in accordance with the principles of the present invention.

Preferred embodiments of the present invention will now be described in detail with reference to the accompanying drawings in which an apparatus for eradicating pests in accordance with the principles of the present invention is generally indicated at 10. Referring to FIG. 1A, the outer housing 12 is illustrated. The housing 12 has a front or first end 14, a rear or second external end 16, an external roof 13 and a rigid base structure 15. The interior volume of the housing is usually referred to herein as the chamber.

Figure 1B:
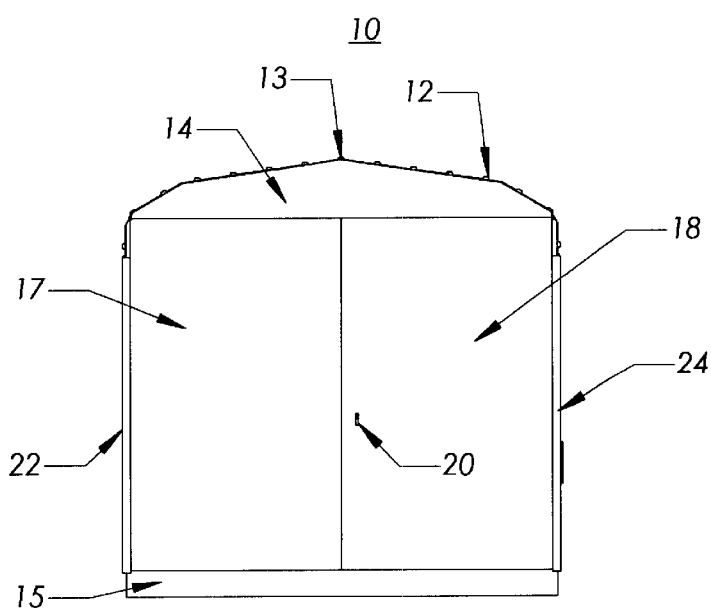
FIG. 1B is a front (or first end) plan view of the apparatus illustrated in FIG. 1A.

The front end 14 of the chamber may be closed off from the outside by a pair of front doors as is illustrated in FIG. 1B. A rectangularly-shaped left door 17 of substantially equal width and height (in one embodiment) as a right door 18 are used to close off the front end of the apparatus. Each of the doors 17, 18 may swing on a plurality of individual hinges or on elongated piano hinges. One or both doors may have a handle 20 and a locking mechanism (not shown).

The doors 17, 18 are preferably insulated. Further, a gasket around the perimeter of each door will reduce the likelihood of heat escaping from the chamber.

As illustrated in FIG. 1B, the apparatus 10 has a left external wall 22 and a right external wall 24. The walls are preferably insulated to ensure a more uniform temperature gradient within the chamber.

Figure 2A:
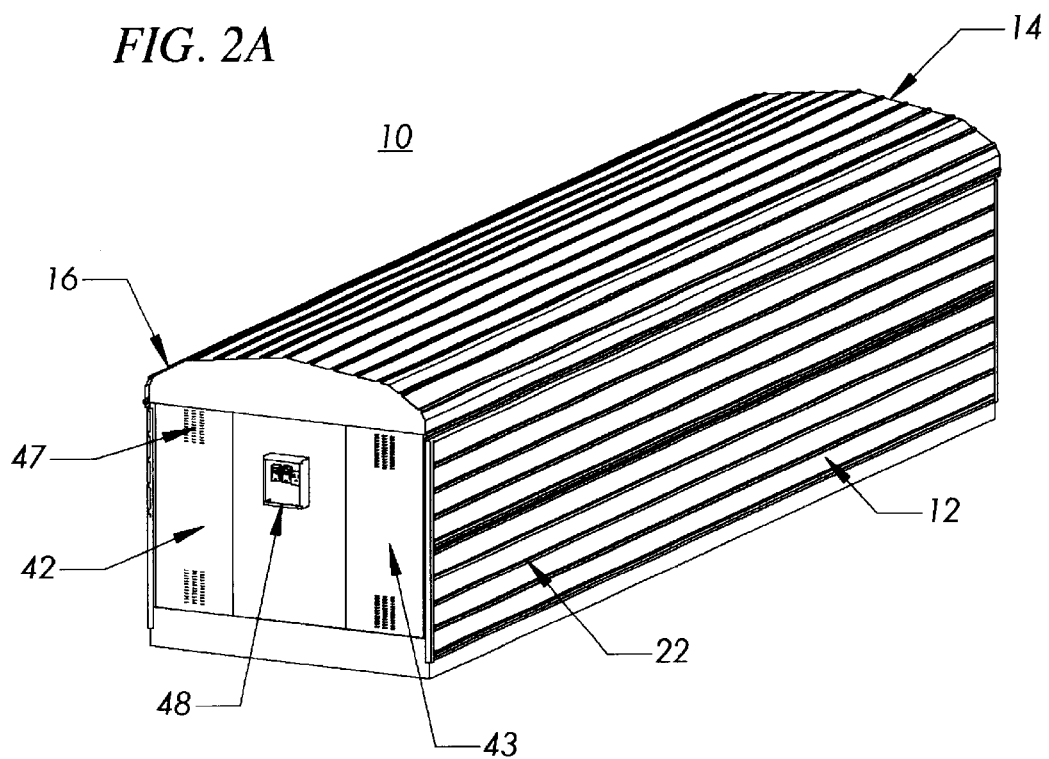
FIG. 2A is a rear (or second end) perspective view of the apparatus illustrated in FIG. 1A.
Figure 2B:
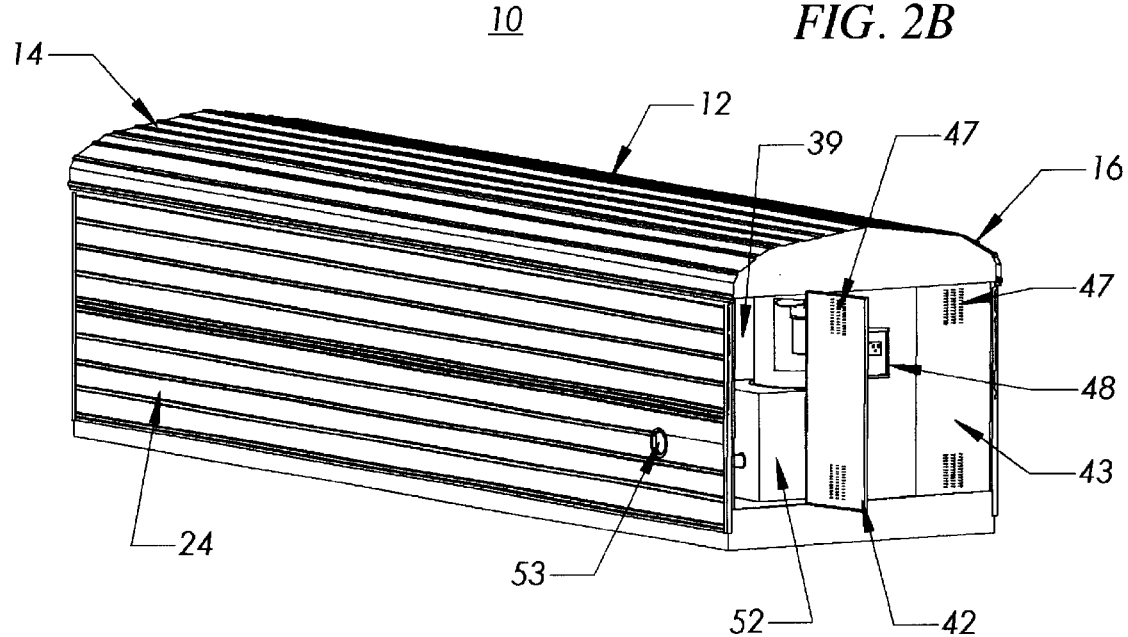
FIG. 2B is an opposite side perspective view of the apparatus illustrated in FIG. 2A with a rear door open.

The rear or second end 16 of the apparatus 10 is illustrated in FIGS. 2A and 2B. A control panel 48 is shown in FIG. 2A. The control panel 48 houses the circuitry to control the heating means 52. In one embodiment, waste gases created as a by-product of the burning of fossil fuels by the heating means 52 are allowed to escape through port 53.

Figure 5A:
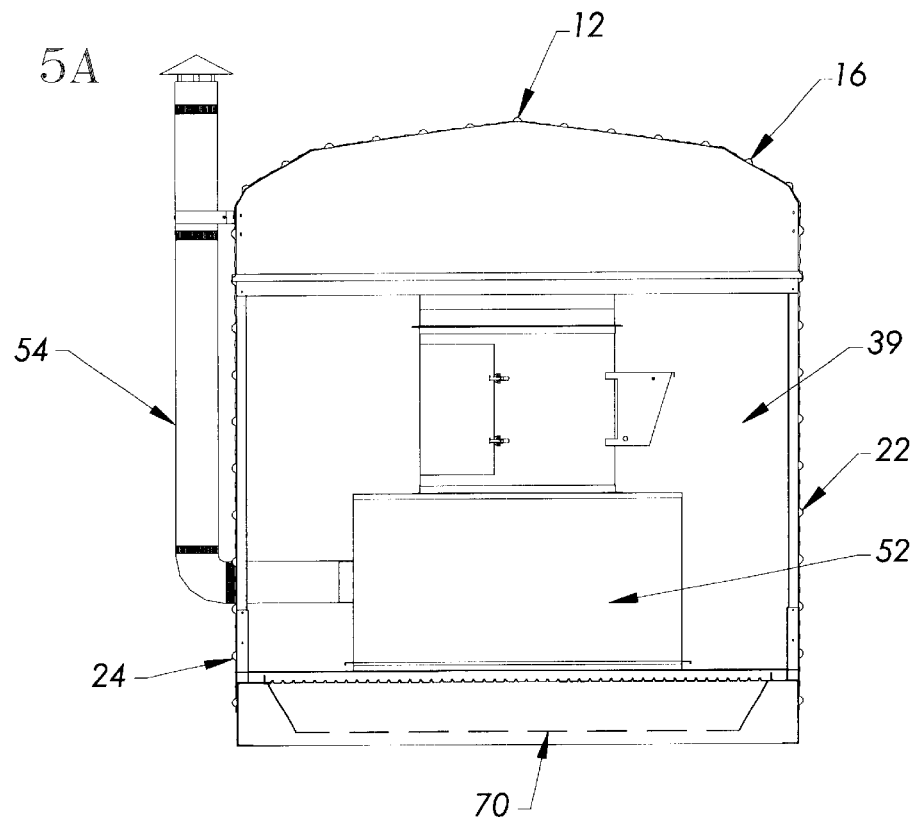
FIG. 5A is a rear (or second end) plan view of the apparatus illustrated in FIGS. 1A and 2A with the rear doors removed.

Left rear door 42 and right rear door 43 provide access to a heater compartment 39 in which the heating means 52 is located. The rear doors 42, 43 may each have one or more ventilation grills 47 therein. The rear or second external end 16 of the apparatus with the doors 42, 43 removed is illustrated in FIG. 5A. A heating means 52 is the device used to heat the air inside the chamber and provides the necessary heat to treat the wood products stored within the chamber. The heating means 52 may be a heater that utilizes electric, gas, oil, wood or other fossil-based fuel. The size (i.e., btu output) of the heater 52 depends on the volume of the chamber and the type of products to be heat-treated.

Figure 5B:
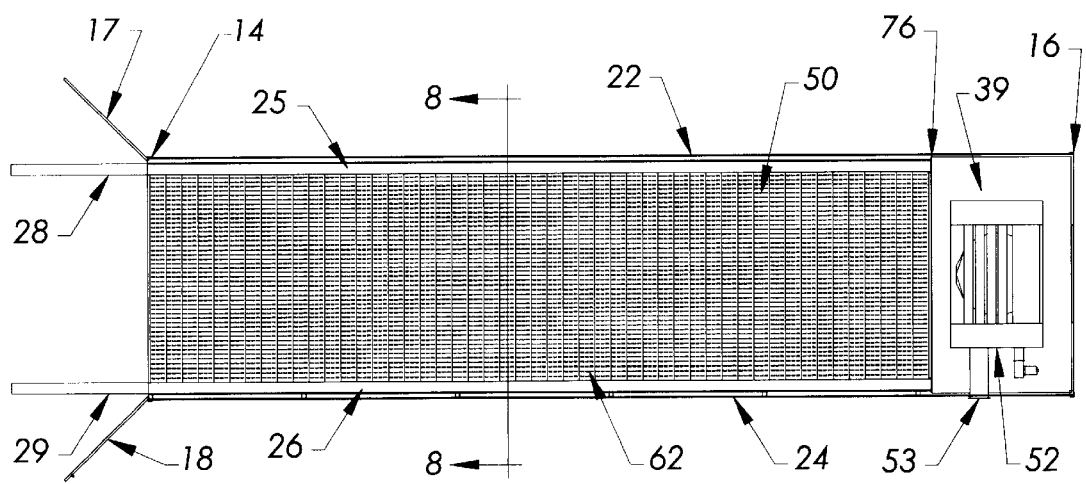
FIG. 5B is a top cutaway view of the interior of the apparatus illustrated in FIG. 1A.

Referring to FIGS. 5A and 5B, the sub-floor 70 is below a primary floor 50. The sub floor 70 extends—at least partially—under the heater compartment 39. Primary floor 50 has a plurality of perforations, the purpose for which, will be more fully described hereinafter.

The subject apparatus 10 may be used to eradicate pests from a variety of products. Although a number of products (e.g., machinery, food products or other staples, etc.) may be treated by the subject apparatus 10, it is especially well-suited for heat-treating wood products.

Common non-manufactured wood products that the present invention may be particularly adapted to heat-treating are wooden pallets and shipping materials. Accordingly, the present invention is illustrated in various figures as being loaded with wood pallets 98. Other non-manufactured wood products can be handled and treated in a similar manner.

Figure 3A:
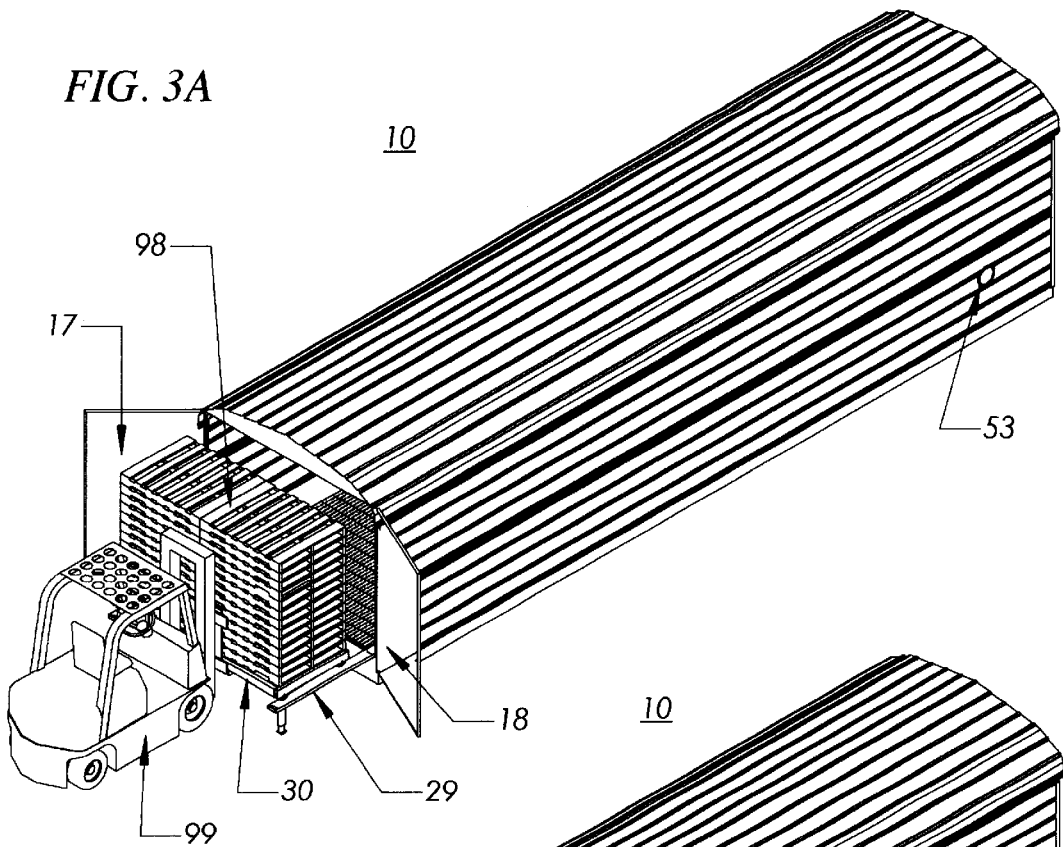
FIG. 3A is a perspective view of the apparatus illustrated in FIG. 1A showing a forklift loading the interior with pallets.
Figure 3B:
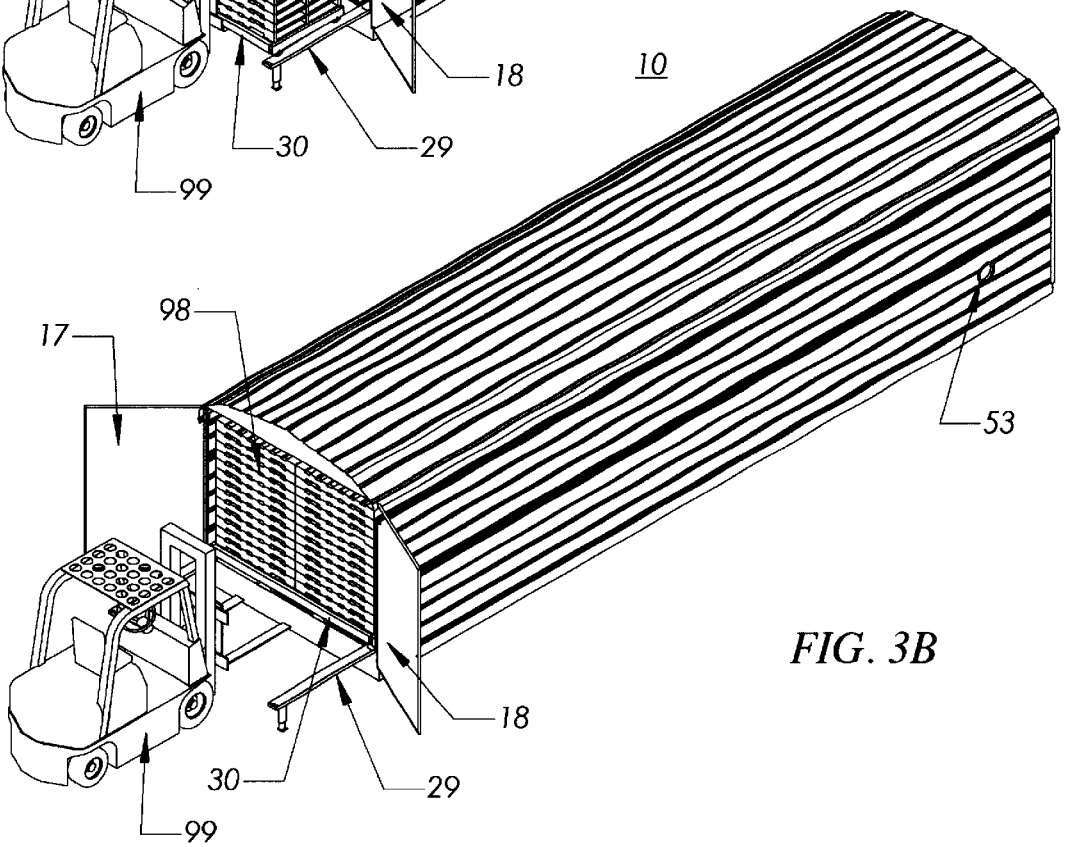
FIG. 3B is a perspective view of the apparatus illustrated in FIG. 3A showing a full interior after the forklift has finished loading the last product cart.

Referring now to FIGS. 3A and 3B, the apparatus 10 may be loaded (in this example with wood pallets 98) through the use of a forklift 99. In this embodiment, left door 17 and right door 18 are opened to allow ingress into and egress from the interior of the apparatus 10.

Figure 4A:
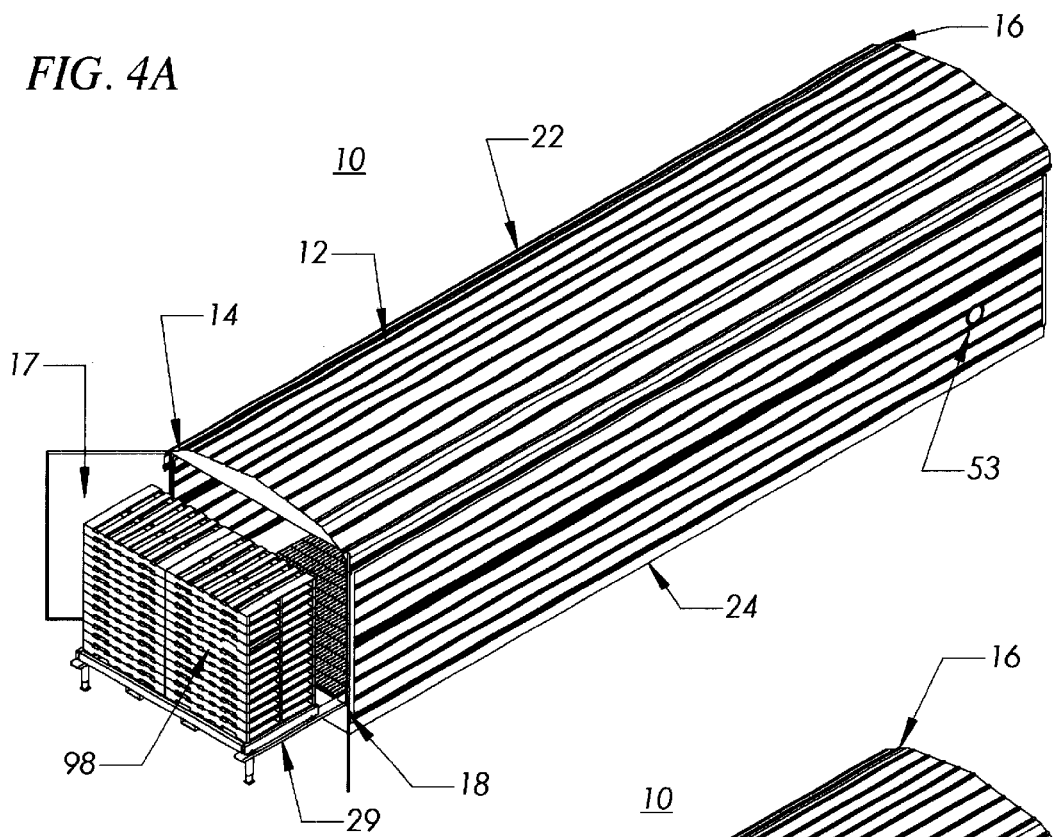
FIG. 4A is a perspective view of the apparatus illustrated in FIG. 3A without the fork-lift present.
Figure 4B:
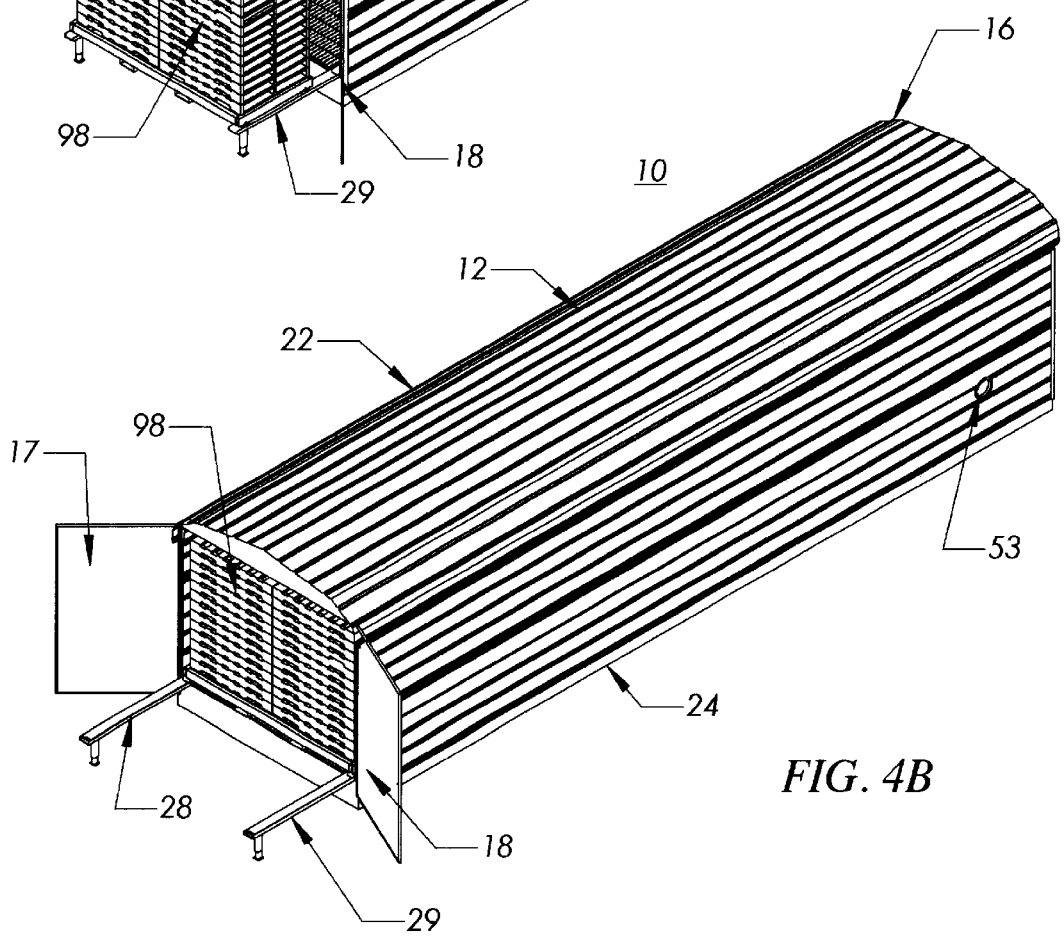
FIG. 4B is a perspective view of the apparatus illustrated in FIG. 3B showing a full interior without the fork-lift present.

Referring to FIGS. 4A, 4B and 5B, elongated internal rails 25, 26 are positioned above the primary floor of the interior of the housing. In a preferred embodiment, the internal rails 25, 26 are welded to the inside of the rigid basal structure 15.

Figure 6A:
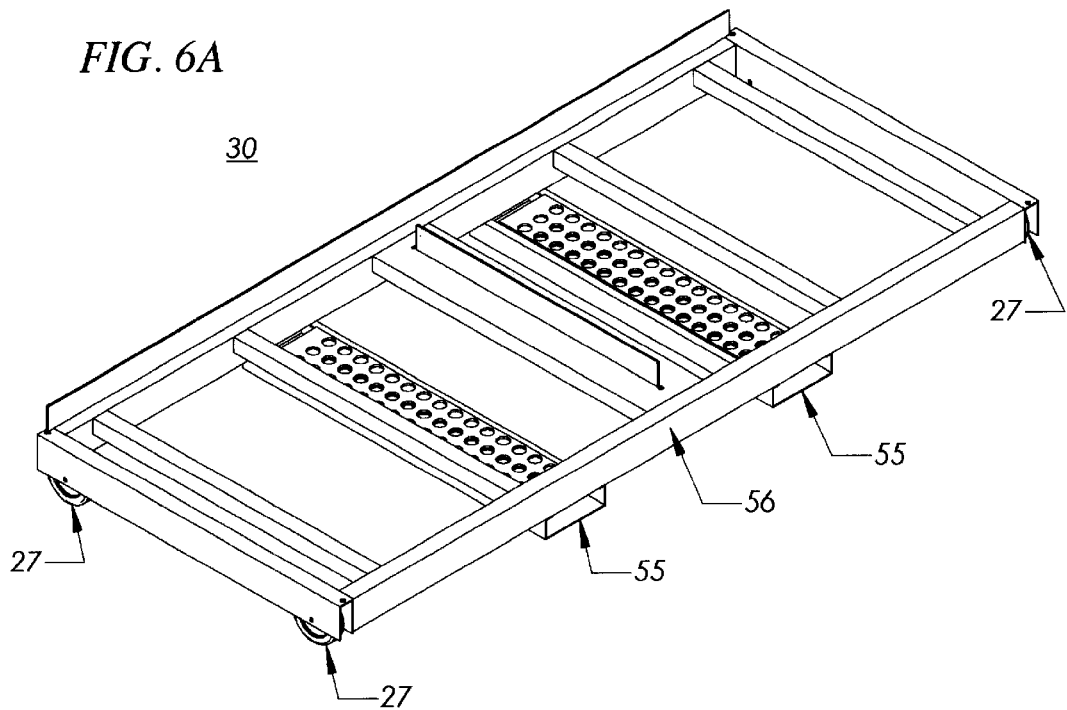
FIG. 6A is an enlarged perspective view of a product cart used in assisting the loading and unloading of the chamber.
Figure 6B:
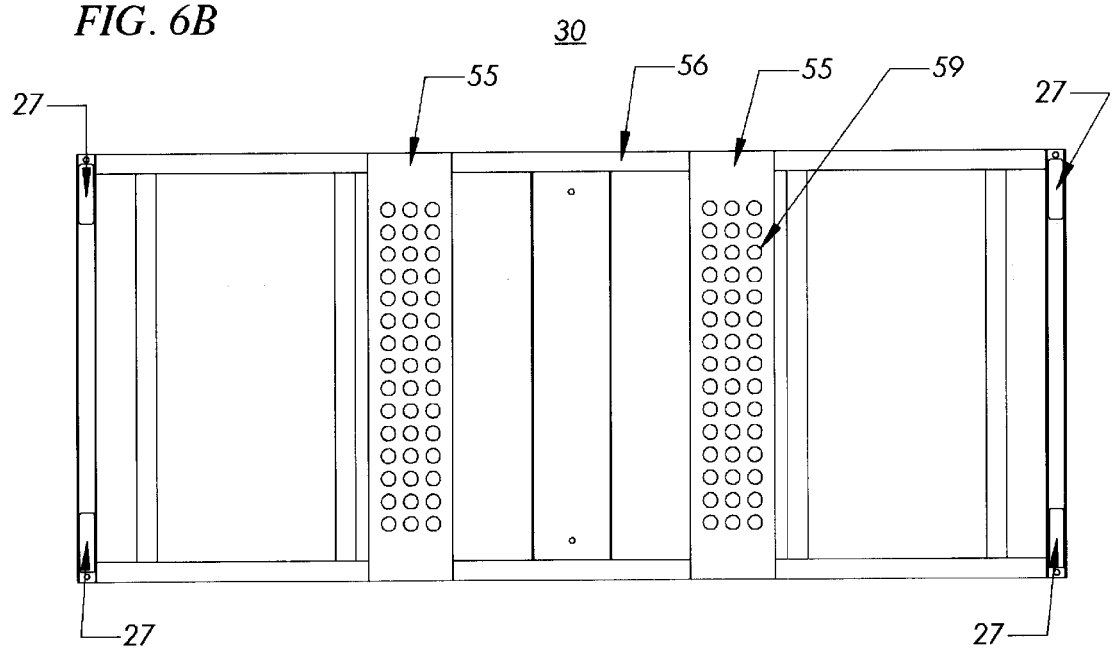
FIG. 6B is a bottom plan view of the product cart illustrated in FIG. 6A.
Figure 7A:
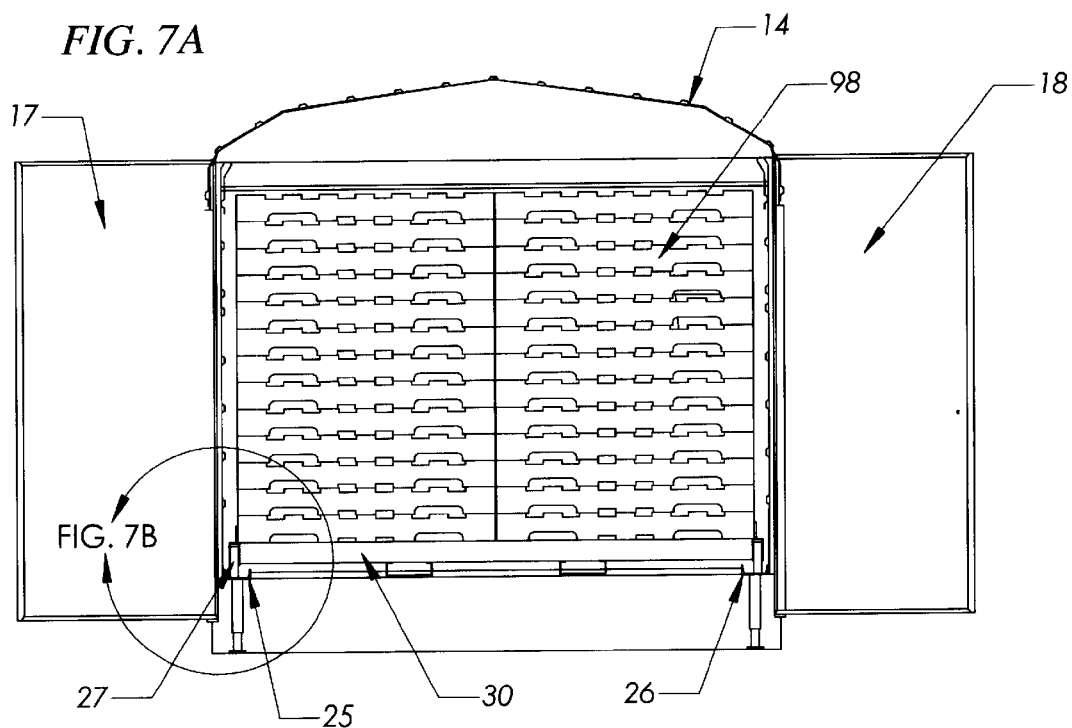
FIG. 7A is a front plan view of the apparatus illustrated in FIG. 1A with the doors open.
Figure 7B:
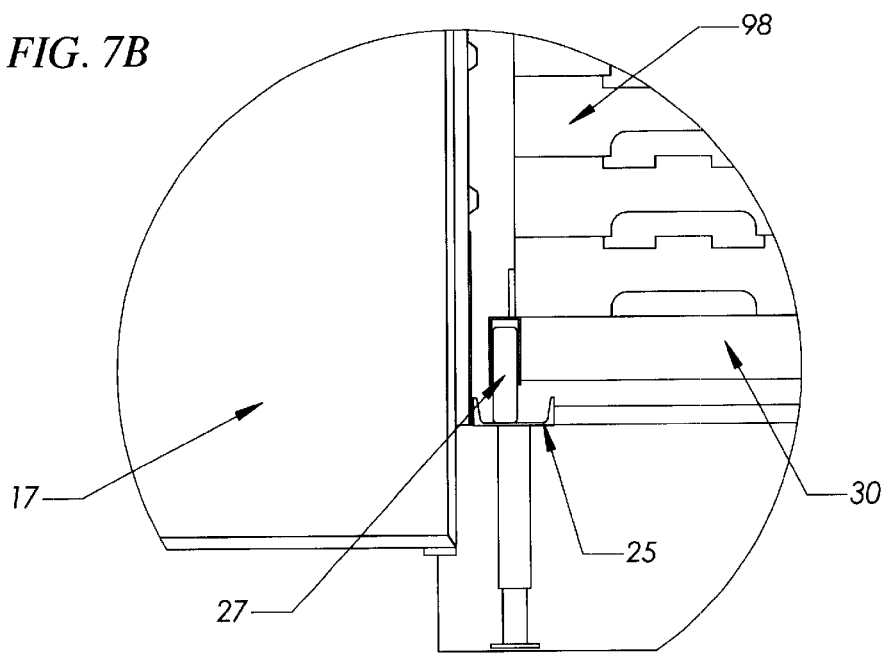
FIG. 7B is an enlarged plan view of a product cart wheel and rail taken at circle 7B of FIG. 7A.

If an unusually heavy load is routinely treated in the chamber, legs may be added to help support the rails. The elongated internal rails are designed to support and guide a product cart 30. (See FIGS. 6A and 6B.)

A left rail external extension 28 and a right rail external extension 29, as illustrated in FIGS. 3A, 3B, 4A, 4B and 5B, assist in supporting the product carts 30 as the apparatus is being loaded and unloaded. The left rail external extension 28 releasably connects to and is directly aligned with the elongated internal rail 25; similarly, the right rail external extension 29 releasably connects to and is directly aligned with the elongated interior rail 26. The external rail extensions 28, 29 are removed and stored when not in use.

Referring again to FIGS. 4A, 4B, 6A and 6B, the pallets 98 and/or wood products are actually placed on product carts 30. The product carts 30 have a rigid frame 56 to support the products to be heat-treated. The frame 56 is preferably rectangular in shape with the longitudinal dimension corresponding roughly to the width of the chamber. A guide wheel 27 is located preferably at each of the four corners of the frame 56. The guide wheels 27 are designed to roll on the rail external extensions 28, 29 and the elongated interior rails 25, 26 in the chamber. The product cart and rail system greatly assist the loading and unloading of wood products to be heat-treated in the chamber.

In one embodiment, each product cart 30 has a width almost as wide as the width of the chamber. The length of the housing depends on a number of factors; for example, some of the factors to be considered are the area on which the apparatus will be situated, the number of wood products to be treated during one cycle, the dimensions of the wood products to be treated, the mass of the wood products to be treated, etc.

Although the various figures show the cart 30 holding two stacks of pallets, one skilled in the art, after reading this disclosure, could readily adapt the length, width and height of the various elements (chamber, cart, etc.) to accommodate a desired number, type and size of products to be treated. The product carts 30 are designed to be loaded by a human or mechanical power. The carts may also be pushed into or pulled out of the chamber by a person. In another embodiment, the primary floor of the chamber may be reinforced to allow a forklift or other machinery to be brought into the chamber to lift, move, load or unload a particularly heavy or unwieldy load.

Referring again to FIGS. 6A and 6B, guides 55 are designed to accommodate the forks or prongs of the fork lift 99. A plurality of ventilation holes 59 are designed to allow the maximum amount of air to circulate up to the products carried on the carts 30.

Figure 8:
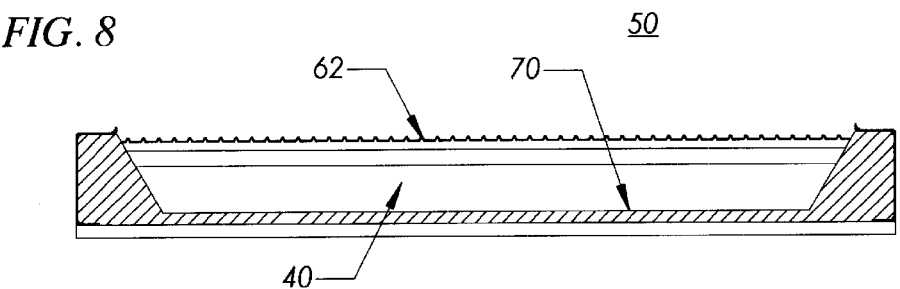
FIG. 8 is a cross-sectional view of the primary floor in the interior of the apparatus of FIG. 1A.

Referring now to FIG. 8, a cross section of the primary floor 50 of FIG. 5B is illustrated. A bottom or floor plenum 40 is formed between the sub-floor 70 and the primary floor 50. The floor plenum 40 allows heated air to travel underneath the entire length of the chamber as will be described in further detail hereafter.

Referring now to FIG. 10A, and 10B ceiling plenum 68 is formed between a sub-ceiling 69 and a primary ceiling 74. The sub-ceiling 69 is made of a substantially flat sheet and stretches across the entire width of the chamber. The sub-ceiling starts from the back wall of the chamber 76 and extends a portion of the way towards the front end 14 of the apparatus. In a preferred embodiment, there are no perforations in the sub-ceiling 69.

Figure 9A:
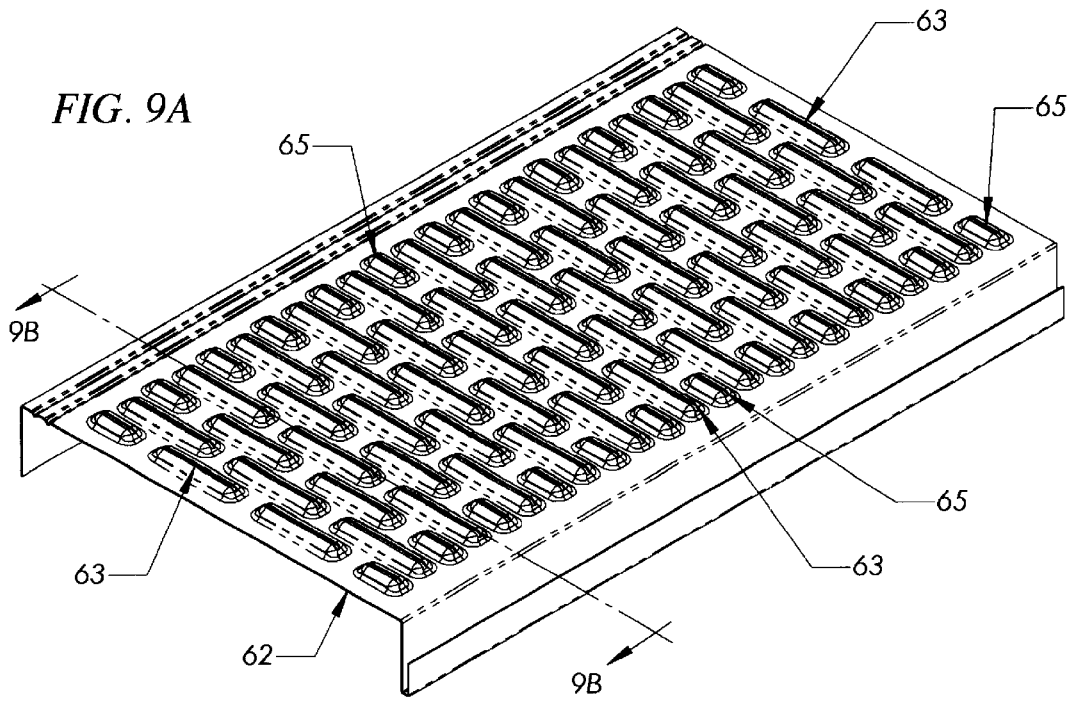
FIG. 9A is a perspective view of a perforated floor section which makes up the primary floor in the interior of the chamber.
Figure 9B:
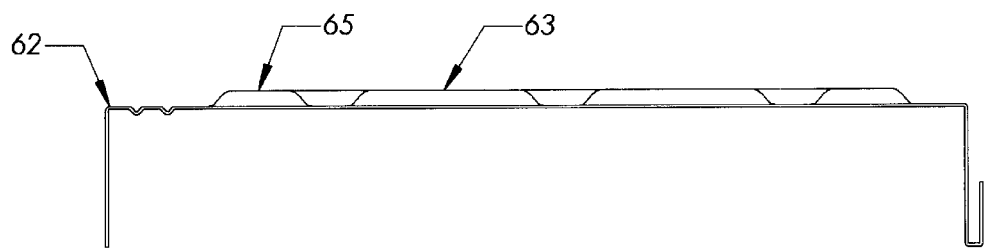
FIG. 9B is an enlarged width-wise cross-sectional view of the perforated floor section illustrated in FIG. 9A taken along line 9B—9B.

Referring now to FIG. 9A, a perforated floor section 62 is shown. A plurality of perforated floor sections 62 are installed in the chamber to form the primary floor 50. The floor sections 62 are perforated in order to allow the heated air to pass from the floor plenum 40 to the product carts 30 and eventually to the products 98 stored on the product carts 30. FIG. 9B is a cross-section of the perforated floor section in FIG. 9A. The length and width of each perforated floor section 62 are relatively unimportant. However, it may be preferable to size each floor section 62 in order for them to be easily moved and lifted by one individual.

Referring again to FIG. 5A an enlarged view of the heater compartment 39 is shown. As stated previously, a forced air heater may be used for the heating means 52 in one embodiment. However, one skilled in the art, after reading this detailed description could readily adapt or substitute other heating means for the forced-air heater. For example, the heating means 52 may be a direct fired heater, either electric or fossil fuel, or an indirect fired heater.

In one embodiment, an exhaust stack 54, connected to port 53 provides a path for the waste gases and combustion by-products generated by the heating means 52 to escape. FIGS. 10A and 10B are longitudinal cross-sectional views of the chamber and include a flow diagram illustrating the path of the air flow within the chamber. The fan assembly 71 circulates through heater 52. In one embodiment the floor plenum 40 is designed to communicate with the output of the heater 52 so that hot air is forced into the floor plenum 40; the hot air rises up through the perforations 63, 65 in the floor sections 62, through the pallets and returned via the ceiling plenum 68.

In the embodiment illustrated in FIG. 10A, the forced heated air travels below the perforated floor sections 62 of the chamber. In the embodiment illustrated in FIG. 10A, the floor plenum 40 is designed to deliver air under the entire floor of the chamber. Since the perforated floor is made up of a plurality of perforated sections 62 having regularly-spaced openings (see FIG. 9A), the heated forced air rises, travels amongst the products and into the ceiling air plenum 68 which directs the air back to the heating means 52.

In the embodiment illustrated in FIG. 10B, the circulation of the air flow is reversed and forced heated air travels through the ceiling plenum 68; the heated air is then drawn substantially evenly through the pallets, through the perforated floor sections 62 and into the floor plenum 40 to be recirculated by the heater 52.

Although the openings in the perforated floor sections 62 are equally-sized and equally-spaced, in one embodiment, the size and spacing of the openings may be varied to ensure that substantially equal air flow passes amongst the products. For example, the perforated floor sections 62 closest to the second end 16 of the chamber may have less openings and/or be spaced further apart than the openings in the perforated floor sections 62 closest to the first end 14.

The sub-ceiling 69 that forms the ceiling air plenum is about three-quarters of the length of the chamber in one preferred embodiment. The length of the sub-ceiling 69, and the shape and number of perforations 63 and 65 in the floor sections 62 ensure that forced hot air moves evenly amongst each stack of products 98. Therefore, the design of the floor plenum, the ceiling plenum and the floor sections 62 ensure that all products 98 within the chamber reach the minimum temperature for the minimum period of time, thereby assuring that the international heat treatment standard can be achieved.

Similarly, in embodiment 10B, the design of the floor return air plenum and ceiling supply plenum ensure that all products 98 within the chamber reach the minimum temperature for the minimum period of times thereby assuring that the international heat treatment standard can be reached.

Tests have proven that the subject apparatus keeps a relatively even temperature distribution throughout the entire chamber without significant hot or cold spots. The present design ensures targeted pests are destroyed and the products are heat-treated properly in a relatively efficient manner without degrading the quality of the products being treated.

In the preferred embodiment a microprocessor based controller can automatically manage the heat treatment process. In this preferred embodiment, a computer is connected to the control panel 48. The control panel 48 communicates with one or more temperature sensors in the chamber in order to control the on/off cycles of the heater 52 and fan assembly 71. By inputting certain parameters, the interior of the chamber can be maintained at a specific temperature for a specific period of time.

Figure 11:
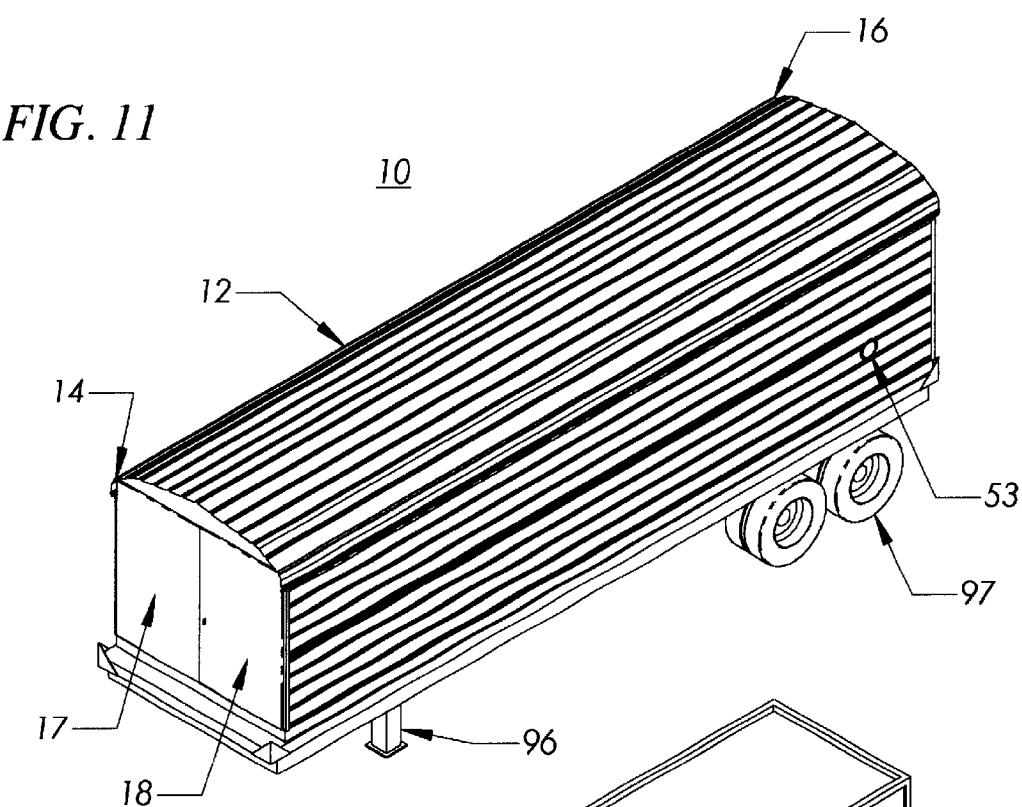
FIG. 11 is a perspective view of the apparatus illustrated in FIG. 1A attached to a wheel/trailer assembly exhibiting the portability of the apparatus.
Figure 12A:
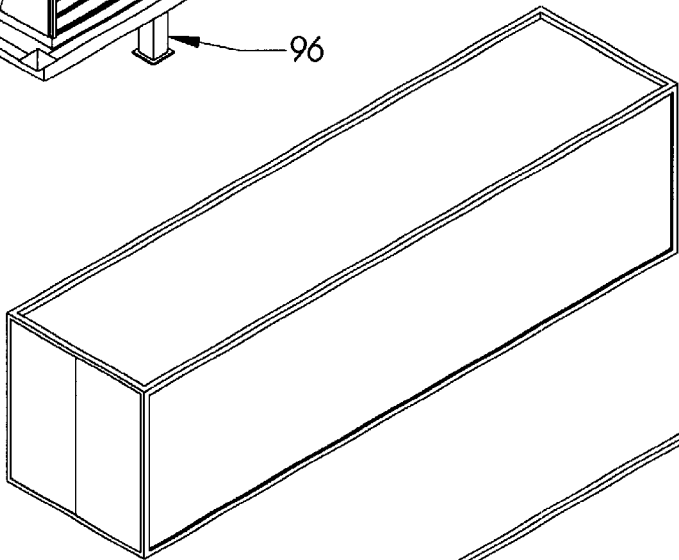
FIG. 12A is a perspective view of standard trailer box which can be adapted to produce an apparatus in accordance with the present invention.
Figure 12B:
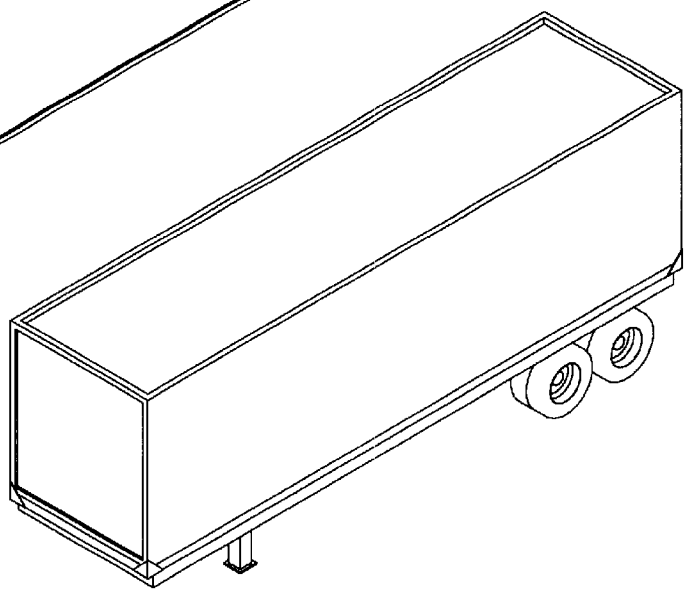
FIG. 12B is a perspective view of the standard trailer box of FIG. 12A mated to a standard trailer assembly.

Referring now to FIG. 11, the chamber maybe mounted on wheels 97 for moving the chamber to a particular location. A tractor, truck or other towing vehicle (not shown) may be used to pull the apparatus 10. Posts 96 allow the apparatus 10 to be self-supporting when a truck or other vehicle is not present. The system, as shown in FIGS. 12A and 12B, can be constructed from an insulated or non-insulated commercial trailer.

The wheels 97 and posts 96 many be removed, and stored for later use, if the apparatus will be stationed at a particular location for an extended period of time.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. A portable apparatus for eradicating pests from both non-manufactured wood and non-manufactured wood products, said apparatus comprising:

a chamber having a first end, a second end, a left wall, a right wall, a ceiling, a partial sub-ceiling, a primary floor, and a sub-floor, said partial sub-ceiling being spaced apart from said ceiling and extending continuously from the second end of the chamber towards the first end of the chamber and terminating at a position short of said first end leaving a portion of the ceiling exposed to the interior of the chamber, the ceiling and sub-ceiling defining a ceiling plenum, and said primary floor being spaced apart from said sub-floor, the primary floor and sub-floor defining a floor plenum, said ceiling plenum and said floor plenum communicating with the interior of the chamber for allowing air to move through the plenums and the interior of the chamber;

a rigid basal structure for supporting said chamber;

a door that allows ingress to and egress from the interior of the chamber, said door positioned at the first end of the chamber;

a means for heating the air in the interior of said chamber, said means of heating communicating with said ceiling plenum and with said floor plenum for moving air heated by said heating means into said chamber and for moving cooler air out of said chamber to be heated by the heating means.

2. The portable apparatus of claim 1 wherein said means for heating comprises a heater and a means for circulating the air within the interior of said chamber.

3. The portable apparatus of claim 2 wherein said heater comprises an indirect fired heating unit.

4. The portable apparatus of claim 2 wherein said heater comprises a direct-fired heating unit.

5. The portable apparatus of claim 2 wherein said heater burns a fossil based fuel (i.e. propane, butane, natural gas, kerosene, diesel fuel, fuel oil).

6. The portable apparatus of claim 2 wherein said heater utilizes an electric heating element.

7. The portable apparatus of claim 2 wherein said means for circulating the air comprises a fan assembly utilizing a fan and electric fan motor.

8. The portable apparatus of claim 7 wherein said fan assembly is a duct axial fan.

9. The portable apparatus of claim 7 wherein said fan assembly is an in-line centrifugal type.

10. The portable apparatus of claim 7 wherein said fan assembly is a backward inclined.

11. The portable apparatus of claim 1 wherein said floor comprises a plurality of floor sections, each section having a plurality of perforations thus providing a means for air to pass freely between said floor plenum and the interior of said chamber.

12. The portable apparatus of claim 1 wherein said means for heating communicates with said plenums proximate the second end of said chamber, and wherein said sub-ceiling is substantially parallel to said ceiling so that air may pass between said ceiling plenum and the interior of said chamber.

13. The portable apparatus of claim 12 wherein said sub-ceiling is formed from a sheet material and extends from the second end three-quarters of the length of the chamber so that the open area comprises an area the width of the chamber by one-quarter of the length of the chamber.

14. The portable apparatus of claim 13 further comprising means for loading and unloading the chamber, said loading and unloading means including:

at least one product cart designed to hold the non-manufactured wood and non-manufactured wood products; and a left rail positioned inside of said left wall and a right rail positioned inside of said right wall, said rails connected to said rigid basal structure substantially parallel to each other and proximate to the upper part of said basal structure above said floor, said rails extending the length of the chamber and designed to both support and assist with the ingress and egress of the product carts from the chamber.

15. The portable apparatus of claim 14 wherein said product carts have a rigid fabricated structure substantially rectangular in shape and a width slightly less than the width of the chamber, said product carts having a plurality of wheels mounted proximate to the bottom of the structure for riding on said rails.

16. The portable apparatus of claim 15 wherein said loading and unloading means further comprises an external left rail extension that can be removably attached to the left rail and a right rail extension that can be removably attached to the right rail for supporting a product cart outside of said chamber.

17. The portable apparatus of claim 16 wherein said product carts have a slot means proximate to the center and substantially parallel with the underside of said product cart thus providing a means for a lifting machine to move product carts on or off of the rail extensions.

18. The portable apparatus of claim 1 wherein said rigid basal structure is substantially a rectangular steel frame.

19. The portable apparatus of claim 18 wherein said rigid basal structure comprises a plurality of support beams substantially parallel to the first and second ends, attached proximate to the bottom of said basal structure thus providing an additional increase in torsional rigidity along with a means of ingress for lifting machines hence facilitating the portability of the unit.

20. The portable apparatus of claim 1 further comprising a tractor wheel assembly attached to the underside of said basal structure for facilitating the movement and transportation of said chamber.

21. The portable apparatus of claim 20 further comprising means for permanently positioning said chamber at a preferred location.

22. The apparatus of claim 1 wherein said means for heating comprises an inlet for allowing outside air to be heated for make-up air as required to pressurize the interior of the chamber.

23. The portable apparatus of claim 1 wherein said means for heating utilizes steam as a source of heat and transference.

24. A portable apparatus for eradicating pests from both non-manufactured wood and non-manufactured wood products, said apparatus comprising:

a chamber having a first end, a second end, a left wall, a right wall, a ceiling, a partial sub-ceiling, a primary floor, and a sub-floor, said partial sub-ceiling being spaced apart from said ceiling and extending continuously from the second end of the chamber towards the first end of the chamber and terminating at a position short of said first end leaving a portion of the ceiling exposed to the interior of the chamber, the ceiling and sub-ceiling defining a ceiling plenum, and said primary floor being spaced apart from said sub-floor, the primary floor and sub-floor defining a floor plenum, said ceiling plenum and said floor plenum communicating with the interior of the chamber for allowing air to move through the plenums and the interior of the chamber;

a rigid basal structure for supporting said chamber;

a door that allows ingress to and egress from the interior of the chamber, said door positioned at the first end of the chamber;

a heater compartment attached to the second end of the chamber;

a heater located in the heater compartment, the heater having the capacity to heat the air in the interior of said chamber to a desired temperature for a desired period of time, the heater having an inlet and an outlet, the outlet of said heater connected to said floor plenum;

means for circulating air having an inlet and an outlet, the outlet of said circulating air means connected to the inlet of said heater, and the inlet of said circulating air means connected to said ceiling plenum; and control means for controlling the operation of said heater and said air circulating means so that when a desired temperature and time period are entered into the control means the heater and air circulating means working together to draw air from the chamber into said ceiling plenum and eventually into said air circulating means, said drawn air then pushed into said heater where it is heated to a predetermined temperature, the heated air then being directed into the floor plenum through the perforated floor and into the chamber, thereby keeping the wood products within the chamber at the desired temperature for the desired period of time.

25. The portable apparatus of claim 24 wherein said heater comprises an indirect fired heating unit.

26. The portable apparatus of claim 24 wherein said heater comprises a direct-fired heating unit.

27. The portable apparatus of claim 26 wherein said means for circulating air comprises a fan assembly utilizing a fan and an electric fan motor.

28. The portable apparatus of claim 27 wherein said floor comprises a plurality of floor sections, each section having a plurality of perforations thus providing a means for air to pass freely between said floor plenum and the interior of said chamber.

29. The portable apparatus of claim 28 wherein said sub-ceiling is formed from a sheet substantially parallel to said ceiling, said sub-ceiling extending continuously from the second end of the chamber three-quarters of the way towards the first end of the chamber leaving an open area proximate said first end, said open area having the width of the chamber and one-quarter of the length of the chamber so that air may pass between said ceiling plenum and the interior of said chamber.

30. The portable apparatus of claim 29 further comprising means for loading and unloading the chamber, said loading and unloading means including:

at least one product cart having wheels and designed to hold the non-manufactured wood and non-manufactured wood products; and a left rail positioned inside of said left wall and a right rail positioned inside of said right wall, said rails connected to said rigid basal structure substantially parallel to each other and proximate to the upper part of said basal structure above said floor, said rails extending the length of the chamber and designed to both support and assist with ingress and egress of the product carts from the chamber.

31. The portable apparatus of claim 30 further comprising a tractor wheel assembly attached to the underside of said basal structure for facilitating the movement and transportation of said chamber.

* * * * *